(No Model.)
W. N. STERNER.
TWO WHEELED VEHICLE.
No. 423,830. Patented Mar. 18, 1890.
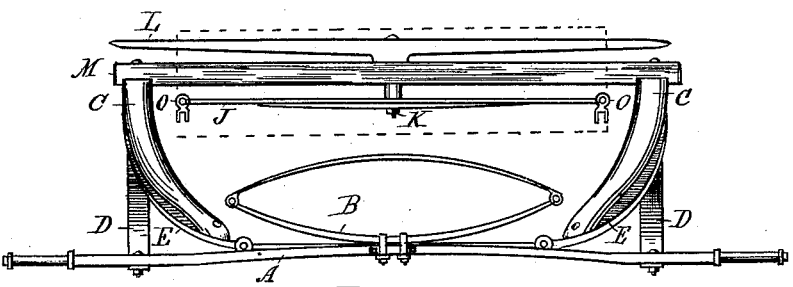
Fig. I.
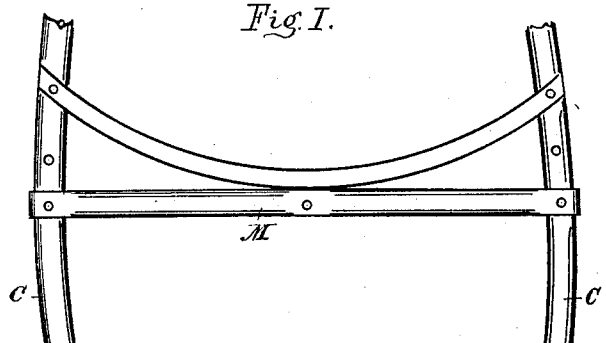
Fig. II.
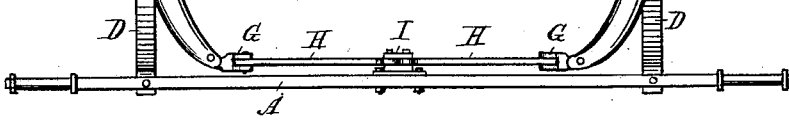
Fig. III.
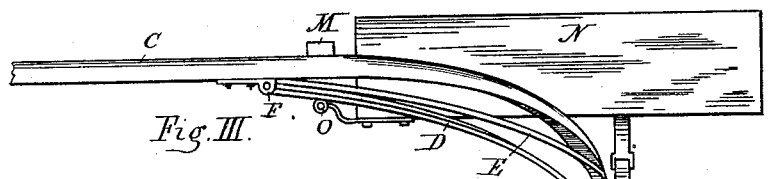
Fig. IV.
WITNESSES:
R. S. Millar
L. M. Adams
INVENTOR:
Wm. N. Sterner.
By O. S. Bailey
Attorney

UNITED STATES PATENT OFFICE.

WILLIAM N. STERNER, OF CINCINNATI, OHIO.

TWO-WHEELED VEHICLE.

SPECIFICATION forming part of Letters Patent No. 423,830, dated March 18, 1890.

Application filed February 4, 1890. Serial No. 339,137. (No model.)

*To all whom it may concern:*

Be it known that I, WILLIAM N. STERNER, of Cincinnati, in the county of Hamilton and State of Ohio, have invented a new and useful Improvement in Two-Wheeled Vehicles, which improvement is fully set forth in the following specification and accompanying drawings, in which—

Figure I is a rear view of my improved two-wheeled vehicle; Fig. II, a top or plan view of the same; Fig. III, a side view showing the position and connections of the side springs, and Fig. IV a side view of the body of the vehicle and its attachment to the transverse front spring.

My invention relates to improvements in two-wheeled vehicles; and its object is to provide a novel and practical device designed to obviate the well-known defects which are inseparable from vehicles of that class as hitherto constructed.

Inventions in this line have been mainly confined to devices looking to the prevention of the unpleasant fore-and-aft rocking motion peculiar to two-wheeled vehicles and which is due to the motion of the horse. Careful observation has shown that another disadvantage has been overlooked. It is easily demonstrated that the action of the horse imparts a lateral as well as a longitudinal rocking motion to the vehicle, and as the shafts are generally attached directly to the axle and also to the body of the vehicle it follows that not only the various movements of the horse, but also the concussion which attends the passage of the wheels over ordinary obstructions, are necessarily imparted directly to the body of the vehicle, and are consequently felt to a greater or less unpleasant degree by the occupant thereof.

My invention consists of an improved construction and novel connection of the several parts whereby the various movements of the horse and also of the running-gear are intercepted and appreciably neutralized before being communicated to the seat of the vehicle.

Referring to the accompanying drawings, A designates the axle, having an elliptical spring B attached thereto in the usual manner. The shafts C have their rear ends bent downwardly and inwardly. Connection between them and the axle is made by means of flattened steel bars D, which are so curved and graduated in size as to operate as springs whenever a forward or backward draft is exerted upon the shafts. In view of the fact that the forward motion of a horse while traveling at an ordinary gait is not actually direct, but alternates from one side to the other, it will be apparent that this variation is compensated by connecting the shafts to the axle through the medium of a spring in the manner described. It will be observed that this part of the device is also designed to operate as a spring-tug, which is manifestly an additional improvement, and will be duly appreciated. The said springs or tugs are supplemented by springs E, which, for convenience, are made integral with the former, and both are secured to the under side of the shafts by a clip and bolt F. The rear ends of the springs E are curved laterally in conformity with the bend of the shafts above them, and are suitably attached thereto by bolts or rivets. Their rear ends are formed into clips G, in which the outer ends of the links H are pivoted. The inner ends of the same are pivoted in the double clip I, which is attached to the front of the axle. By this means I counteract the tendency in vehicles of this description to all excessive throwing or vaulting when passing over obstructions. It will be evident that when the outer ends of the links are moved to an appreciable extent above or below their normal horizontal position there will be an inward pull on their connections, which will be resisted by the ends of the shafts. Any undesirable vertical motion of the bed will thus be gradually but promptly checked. The front spring J is suspended transversely on the bolt K, which connects the singletree L and cross-bar M. The ends of this spring are attached to the front of the body N by shackles O.

It will be understood that, there being no absolutely rigid connections between the body of the vehicle and the horse or the running-gear, this device possesses advantages not hitherto attained.

What I claim as new is—

1. In a two-wheeled vehicle, the herein-described bent shafts, the springs or elastic tugs connecting the shafts to the axle, the supplementary springs attached to the tugs and to the rear ends of the shafts, the links pivotally connected to the axle and to the rear ends of the shafts, and the transverse spring attached to the cross-bar and to the body of the vehicle, substantially as herein set forth.

2. In a two-wheeled vehicle, the herein-described bent shafts, the springs or tugs connecting the shafts to the axle, the supplementary springs, and the pivotally-connecting links, as described, in combination with the axle, substantially as herein set forth.

3. The combination of the bent shafts, the springs connecting the shafts to the axle, the supplementary springs, the pivotally-connecting links, as described, and the front transverse spring with the axle and the body of the vehicle, substantially as herein set forth.

In testimony that I claim the foregoing I have hereunto set my hand, this 1st day of February, 1890, in the presence of witnesses.

WILLIAM N. STERNER.

Witnesses:
ROBT. S. MILLAR,
L. M. ADAMS.